US012781371B2

(12) United States Patent
Ho

(10) Patent No.: US 12,781,371 B2
(45) Date of Patent: Nov. 3, 2026

(54) SYSTEM AND PROCESS FOR PURIFICATION AND CONCENTRATION OF LITHIUM

(71) Applicant: FORAGER STATION, INC., Sterling, VA (US)

(72) Inventor: Patrick Ho, Sterling, VA (US)

(73) Assignee: FORAGER STATION, INC., Sterling, VA (US)

( * ) Notice: Subject to any disclaimer, the term of this patent is extended or adjusted under 35 U.S.C. 154(b) by 489 days.

(21) Appl. No.: 18/535,455

(22) Filed: Dec. 11, 2023

(65) Prior Publication Data

US 2024/0209536 A1 Jun. 27, 2024

Related U.S. Application Data

(60) Provisional application No. 63/432,284, filed on Dec. 13, 2022.

(51) Int. Cl.

| | |
|---|---|
| ***C25C 7/06*** | (2006.01) |
| ***B01D 61/44*** | (2006.01) |
| ***B01D 61/48*** | (2006.01) |
| ***C25C 1/02*** | (2006.01) |
| ***C25C 7/04*** | (2006.01) |

(52) U.S. Cl.

CPC ................ *C25C 7/06* (2013.01); *B01D 61/44* (2013.01); *B01D 61/48* (2013.01); *C25C 1/02* (2013.01); *C25C 7/04* (2013.01)

(58) Field of Classification Search

None

See application file for complete search history.

(56) References Cited

U.S. PATENT DOCUMENTS

2020/0001251 A1* 1/2020 Demeter .............. B01D 61/422

FOREIGN PATENT DOCUMENTS

WO WO-2022157624 A1 * 7/2022 ............... C25B 1/16

OTHER PUBLICATIONS

Palagonia et al. "Lithium recovery from diluted brine by means of electrochemical ion exchange in a flow-through-electrodes cell" Desalination 475 '2020' 114192 (Year: 2020).*

* cited by examiner

*Primary Examiner* — Wojciech Haske

(74) *Attorney, Agent, or Firm* — Stanzione & Associates, PLLC; Patrick Stanzione

(57) ABSTRACT

A system and process for purifying and concentrating lithium using a sequential and cyclical process of charging and discharging electrodes to selectively push ions from cell to cell, repeatedly drawing lithium from a cell containing source brine naturally containing lithium into a cell containing recovery brine intended to continually increase in lithium concentration.

15 Claims, 10 Drawing Sheets

SYSTEM AND PROCESS FOR PURIFICATION AND CONCENTRATION OF LITHIUM

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

Field of the Invention

The present inventive concept relates to a system and process for purification and concentration of lithium. More particularly, but not exclusively, this inventive concept relates to a system and process for purification and concentration of lithium by an electrochemically mediated ion exchange.

Description of the Related Art

Lithium is one of the most critical minerals for battery production. "As noted, a large majority of lithium processing currently occurs in China, with essentially none of the processing occurring in the United States. The world's total annual production of lithium is currently 82,000 tonnes." See "Building Resilient Supply Chains, Revitalizing American Manufacturing, and Fostering Broad-Based Growth," *The White House, June* 2021.

Direct Lithium Extraction (DLE) technology is defined as technology which purifies and concentrates lithium from brine without reliance on direct solar evaporation. To date, no commercially viable Direct Lithium Extraction technology has gone beyond a pilot scale. The current top Direct Lithium Extraction technologies have a process capacity up to only 40 tonnes of lithium production per year.

Economically viable electrochemical lithium extraction is an innovation that would increase the global supply of lithium. US based electrochemical lithium extraction resources are abundant. Continental brines contain significant quantities of lithium in both surface and subsurface bodies of water. Oilfields also often contain concentrations of lithium in excess of 100 ppm. The annual potential of American production capacity of lithium exceeds 500% of the current annual global supply. However, US brine resources are also of low grade and beyond current technical capabilities for processing lithium.

U.S. Pat. No. 5,951,843 discloses a process of using of a perovskite structure lithium ion conducting solid electrolyte membrane to selectively filter out lithium from a liquid.

U.S. Pat. No. 10,177,366 B2 discloses where the use of lithium conductive solids is known to filter lithium from a mixture of impurities to purities exceeding 99.96%. Accordingly, obtaining purity of a resulting solution of lithium is well known.

However, there is a need for a system and process which significantly decreases the energy input into a system required to drive purification.

SUMMARY OF THE INVENTIVE CONCEPT

The present general inventive concept provides a system and process for purification and concentration of lithium.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of purifying and concentrating lithium (Li), the method comprising: connecting a first cell having a first electrode therein to a second cell having a second electrode therein by disposing a first water-impermeable lithium selective conductive membrane therebetween; connecting a third cell having a third electrode therein to a fourth cell having a fourth electrode therein by disposing a second water-impermeable lithium selective conductive membrane therebetween; connecting the first cell to the fourth cell by disposing a first anion exchange membrane (AEM) therebetween; connecting the second cell to the third cell by disposing a second anion exchange membrane (AEM) therebetween; filling the first cell with an NaCl flushing solution and filling the fourth cell with an LiCl recovery solution such that upon application of a voltage the fourth electrode discharges Li+, the Na is removed from the NaCl flushing solution into the first electrode to charge the first electrode with Na+ and the Cl transports across the first AEM from the first cell to the fourth cell; draining the Li+ enriched LiCl recovery solution from the fourth cell and flushing the NaCl depleted NaCl solution from the first cell; adding brine containing Li to the first cell and applying a voltage to the first electrode to discharge Na+ from the first electrode therefrom and LiCl recovery solution to the second cell and a voltage to charge the second electrode with Li while Li transports across the first water-impermeable lithium selective conductive membrane from the first cell to intercalate into the second electrode to charge the second electrode with Li+; then draining the waste brine from the first cell; adding an NaCl flushing solution to the third cell to charge the third electrode with Na+ while Cl transports across the second AEM from the third cell to the second cell; discharging the second electrode to delithiate the Li+ for recovery and concentration of Li; draining Li enriched LiCl recovery solution from the second cell and flushing NaCl depleted NaCl solution from the third cell; adding brine solution with Li to the third cell and LiCl recovery solution to the fourth cell to energize the fourth electrode with Li while Li transports across the second water-impermeable lithium selective conductive membrane from the third cell to the fourth electrode; discharging Na from the third electrode while the fourth electrode is charged with Li+; and draining waste brine solution from the third cell and adding NaCl flushing solution to the first cell.

In an exemplary embodiment the first and second water-impermeable lithium selective conductive membranes can be made of Lithium Lanthanum Titanium Oxide (LLTO).

In another exemplary embodiment the first and second water-impermeable lithium selective conductive membranes can be made of one of Lithium Lanthanum Zirconium Tantalum Oxide LLZTO, Lithium Aluminum Titanium Phosphate LATP, Lithium Aluminum Germanium Phosphate LAGP, Lithium Aluminum Titanium Oxide LATO, or composite membranes incorporating polymers, or composite membranes incorporating lithium containing conducting salt.

In another exemplary embodiment the method can further comprise placing the LiCl mixture in contact with a first side of an ion-impermeable membrane while placing a highly concentrated NaCl draw solution in contact with a second side of the ion-impermeable membrane to drive water down the concentration gradient and out of the LiCl mixture; placing the LiCl mixture into a reverse osmosis/electrodialysis brine concentrator to concentrate the LiCl with impurities and to draw out fresh water therefrom; placing the LiCl mixture with impurities from the reverse osmosis/electrodialysis brine concentrator in an Li2CO3 precipitator; adding Sodium Carbonate (Na2CO3) to the Li2CO3 precipitator with the LiCl mixture to create Lithium Carbonate (Li2CO3) from the dissolved Li in the mixture; and heating the concentrated lithium carbonate mixture (Li2CO3) to 50-100 degrees Celsius to precipitate the concentrated lithium carbonate mixture (Li2CO3).

In still another exemplary embodiment the water obtained from the water driven down the concentration gradient can be added to the highly concentrated NaCl draw solution or added to the LiCl recovery solutions.

In still another exemplary embodiment remaining waste product NaCl with some lithium carbonate from the precipitate can be recycled as NaCl concentrate.

In yet another exemplary embodiment the method can further comprise placing the LiCl mixture in contact with a first side of an ion-impermeable membrane while placing a highly, concentrated NaCl draw solution in contact with a second side of the ion-impermeable membrane to drive water down the concentration gradient and out of the LiCl mixture; placing the concentrated LiCl mixture with impurities in an Li2CO3 precipitator; adding Sodium Carbonate (Na2CO3) to the Li2CO3 precipitator with the LiCl mixture to create Lithium Carbonate (Li2CO3) from the dissolved Li in the mixture; and heating the concentrated lithium carbonate mixture (Li2CO3) to 50-100 degrees Celsius to precipitate the concentrated lithium carbonate mixture (Li2CO3).

In yet another exemplary embodiment the method can further comprise placing the LiCl mixture through a reverse osmosis/electrodialysis brine concentrator to concentrate the LiCl and draw out water therefrom; placing the concentrated LiCl mixture in an Li2CO3 precipitator; adding Sodium Carbonate (Na2CO3) to the Li2CO3 precipitator with the LiCl mixture to create Lithium Carbonate (Li2CO3) from the dissolved Li in the mixture; and heating the concentrated lithium carbonate mixture (Li2CO3) to 50-100 degrees Celsius to precipitate the concentrated lithium carbonate mixture (Li2CO3).

In still another exemplary embodiment the water obtained from the water driven down the concentration gradient can be added to the highly concentrated NaCl draw solution or added to the LiCl recovery solutions.

In still another exemplary embodiment remaining waste product NaCl with some lithium carbonate from the precipitate is recycled as NaCl concentrate.

The foregoing and/or other features and utilities of the present general inventive concept may also be achieved by providing a method of purifying and concentrating lithium (Li), the method comprising: connecting a first cell having a first electrode therein to a second cell having a second electrode therein by disposing a water-impermeable lithium selective conductive membrane therebetween; fill the first cell with NaCl flushing solution to charge the first electrode with Na+; filling a first cell with a brine naturally containing Li; filling a second cell with an LiCl recovery solution; deintercalating Na from the first electrode the cause Li to transport across the first water-impermeable lithium selective conductive membrane to intercalate into the second electrode; draining the first cell of brine depleted of Li; isolating the water-impermeable lithium selective conductive membrane from the first and second cells; connecting a anion exchange membrane (AEM) between the first cell and the second cell; fill the first cell with NaCl flushing solution; and deintercalating Li from the second electrode to cause Na to intercalate into the first electrode, to transport Cl across the AEM, to enrich the LiCl recovery solution in the second cell and to charge the first electrode with Nat.

In an exemplary embodiment the water-impermeable lithium selective conductive membrane can be made of Lithium Lanthanum Titanium Oxide (LLTO).

The foregoing and/or other features and utilities of the present general inventive concept may also be achieved by providing a method of purifying and concentrating lithium (Li), the method comprising: connecting a first cell having a first electrode therein to a second cell by disposing a first water-impermeable lithium selective conductive membrane therebetween; connecting a third cell having a second electrode therein to a fourth cell by disposing a second water-impermeable lithium selective conductive membrane therebetween; connecting the first cell to the fourth cell by disposing a first anion exchange membrane (AEM) therebetween; connecting the second cell to the third cell by disposing a second anion exchange membrane (AEM) therebetween; filling the first cell with a brine naturally containing Li and applying a voltage to discharge the first electrode of Na+ therefrom while Li transports across the first water-impermeable lithium selective conductive membrane from the first cell into the second cell and enrich the second cell with Li+; filling the second cell with an LiCl recovery solution; adding an NaCl flushing solution to the third cell while applying a voltage to charge the second electrode with Na+ while Cl transports across the second AEM from the third cell to the second cell, thus causing the NaCl solution in the third cell to be depleted of Na+ and Cl; draining fluids from the first cell (waste brine), the second cell (Li enriched), and the third cell (waste flush); adding brine with naturally occurring Li to the third cell while applying a voltage to the second electrode to discharge Na+ therefrom such that Li transports across the second water-impermeable lithium selective conductive membrane to the fourth cell; adding LiCl recovery solution to the fourth cell to enrich the LiCl recovery solution with Li+; adding NaCl flushing solution to the first cell while applying a voltage to charge the first electrode with Na+ while Cl transports across the second AEM from the first cell to the fourth cell, thus causing the NaCl solution in the first cell to be depleted of Na+ and Cl; and draining fluids from the first cell (waste flush), the third cell (waste brine), and the fourth cell (Li enriched).

In an exemplary embodiment the first and second water-impermeable lithium selective conductive membranes can be made of Lithium Lanthanum Titanium Oxide (LLTO).

In another exemplary embodiment the first and second water-impermeable lithium selective conductive membranes can be made of one of Lithium Lanthanum Zirconium Tantalum Oxide LLZTO, Lithium Aluminum Titanium Phosphate LATP, Lithium Aluminum Germanium Phosphate LAGP, Lithium Aluminum Titanium Oxide LATO, or composite membranes incorporating polymers, or composite membranes incorporating lithium containing conducting salt.

BRIEF DESCRIPTION OF THE DRAWINGS

These and/or other features and utilities of the present inventive concept will become apparent and more readily appreciated from the following description of the embodiments, taken in conjunction with the accompanying drawings of which.

Figure 1:
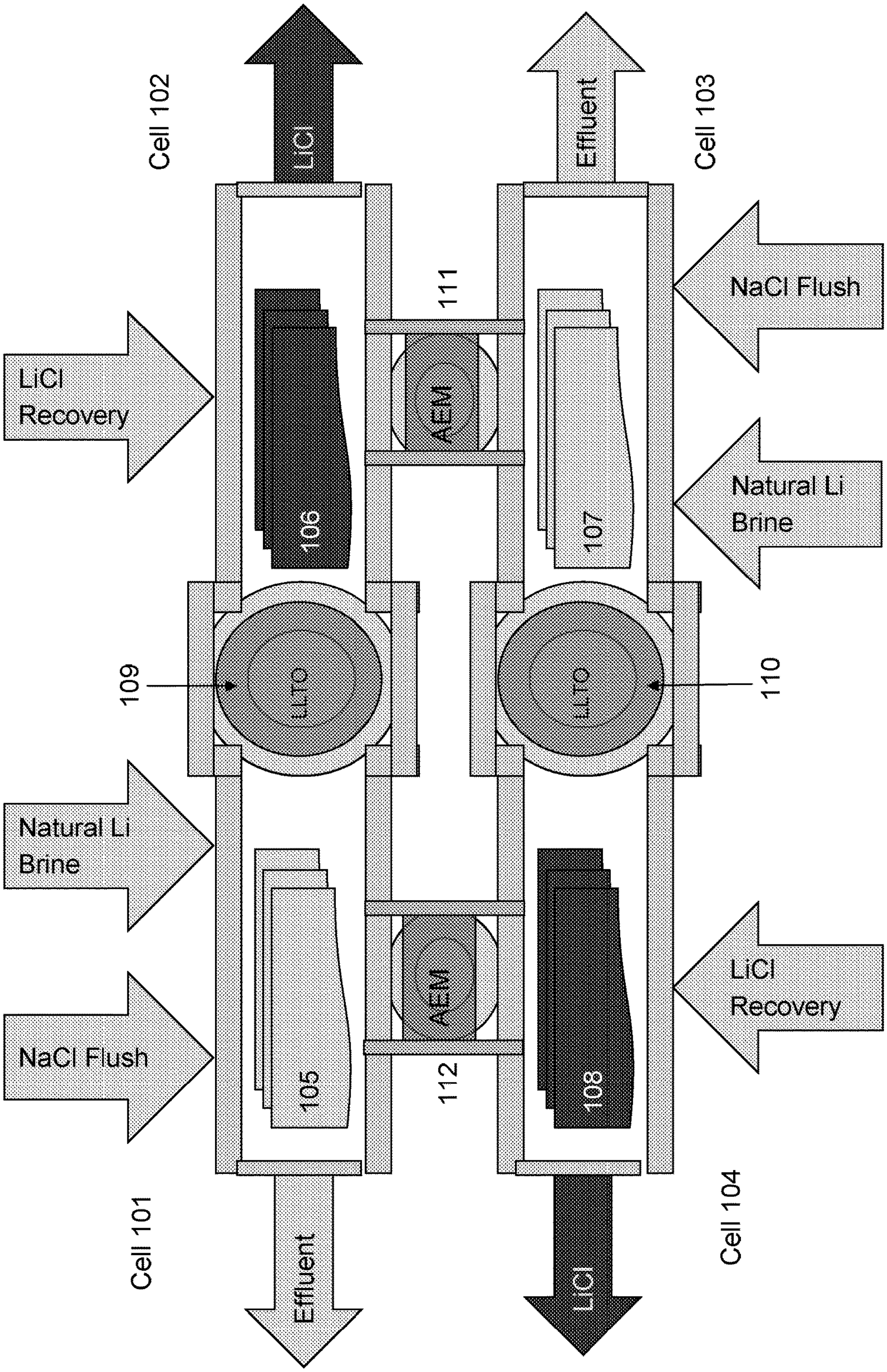
FIG. 1 illustrates a process for purification and concentration of lithium, according to an example embodiment of the present inventive concept.

The drawings illustrate a few exemplary embodiments of the present inventive concept and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

Exemplary embodiments of the present general inventive concept are directed to a system and process for purification and concentration of lithium, and more particularly, but not exclusively, this present inventive concept relates to a system and process for purification and concentration of lithium by an electrochemically mediated ion exchange.

According to example embodiments of the present inventive concept, processes are provided which utilize a cycle where different cells are filled and drained of fluid in a batch process. This cycle can include an extraction step and a recovery step, where this cycle is performed repeatedly through multiple cells.

More specifically, the invention uses a sequential and cyclical process of charging and discharging electrodes to selectively push ions from cell to cell, repeatedly drawing lithium from a cell containing source brine naturally containing lithium into a cell containing recovery brine intended to continually increase in lithium concentration. Lithium ions, with one positive charge, can be controlled in an ionic current via electrical means. An example arrangement of the present inventive concept is to provide four cells with one electrode per cell, with each cell separated by a membrane that is selective for a particular target ion. The inventive concept may be extended to an indefinite number of cells as long as a complete circuit is made. Alternative arrangements functioning on the same principle are also described herein.

A "charged" electrode means the electrode's active material (such as, for example FePO4 or Mn2O4) is intercalated with a selected ion. A "discharged" electrode means there are vacancies in the material where previously intercalated ions have vacated due to electrons being removed from the material. Ionically selective membranes are provided to ensure only the desired ion is mobile between cells. The electrodes may be one or more flat plates inside of or attached to the walls of the cell, or an electrode may take up the entirety of a cell's volume by being composed of a carbon or metallic foam with pores for fluid flow. The membranes may be fixed in place, or they may be manipulated via a mechanism which insulates the membrane from the circuit without significantly changing the operation of the present inventive concept. The membrane's function is to provide the high ionic selectivity needed to separate lithium at real world concentration ratios, and the electrodes function to ensure low-resistance, highly-energy-efficient redox reactions to drive lithium extraction forward.

The present inventive systems and processes according to the example embodiments of the present inventive concept provide "ion exchange" steps which significantly decrease energy input into a system required to drive purification of lithium. The processes utilize an "ion exchange" extraction step where a cation, such as, for example sodium (Na) or potassium (K) is pushed into the source brine naturally containing lithium (li). In the extraction step, an electrical circuit removes an electron from a sodium-intercalated electrode. Sodium ions deintercalating from, for example, an iron phosphate (FePO4) or manganese oxide (Mn2O4) electrode then drive lithium (Li) from a naturally lithium containing brine resource across a lithium selective ionically conducting membrane. This step increases the concentration of sodium (Na) in the brine and decreases the concentration of lithium (Li) in the source brine. The addition of a positively charged ion such as, for example sodium or potassium to the brine maintains a favorable electrical environment for lithium to migrate across a lithium selective membrane. The membrane completes the circuit by allowing mainly lithium to pass, although a small leakage current of impurities may also be expected. The membrane strongly rejects divalent ions such as magnesium and calcium. On the other side of the membrane, the lithium ions can be intercalated into an iron phosphate or manganese oxide electrode immersed in recovery solution, gaining an electron to complete the electrical circuit. This is the redox reaction commonly occurring in lithium ion batteries and sodium ion batteries, akin to charging the battery. The electrode on the other side of the membrane is "charged" with lithium, and this lithium must be released into the recovery solution in the recovery step.

Extraction Step Reaction (with FePO4 as an example, Mn2O4 functions similarly well)

$$NaFePO_4 \rightarrow Na^+ + FePO_4 + e^-$$

$$Na^+ + LiCl \rightarrow NaCl + Li^+$$

$Li^+ + LLTO|LLZTO \rightarrow LLTO|LLZTO + Li^+$ (Transport Lithium Ion across Lithium Selective Membrane)

$$Li^+ + FePO_4 + e^- \rightarrow LiFePO_4$$

In the recovery step, the goal is to charge up a new electrode for the next extraction step, while at the same time drawing lithium into the lithium recovery solution. The brine containing natural lithium is drained and a new cell connected via an anion exchange membrane (selective for Cl—) is filled with a sodium chloride flushing solution. An electric current is applied again, causing lithium ions to become deintercalated from the charged electrode and flooding into the recovery solution. This increases the concentration of lithium in the recovery solution. At the same time, sodium ions are intercalated into the new electrode to prepare a new extraction step. This depletes the flushing solution of both Na+ and Cl—. This is the reverse redox reaction from the extraction step and resets the system, akin to discharging the battery, although it occurs in a new cell and with a different electrode. Chloride ions are driven across a different anionic conductive membrane, pairing with the newly freed lithium ions. The system uses empty cells as air gaps (or, the functionally equivalent mechanical swapping or insulation of membranes) as open circuits to ensure the process continues into new cells at each step without accidentally moving ions backwards into previous cells.

Recovery Step Reaction (with FePO4 as an example, Mn2O4 functions similarly well)

$$LifePO_4 \rightarrow Li^+ + FePO_4 + e^-$$

$$Li^+ + Cl^- \rightarrow LiCl$$

$Cl^- + AEM \rightarrow AEM + Cl^-$ (Transport Chloride Ion across Anionic Selective Membrane)

$$NaCl + FePO_4 + e^- \rightarrow NaFePO_4 + Cl^-$$

The system can use air gaps as open circuits to ensure the process continues into new cells at each step. The system may also use movable parts located at or around the membranes to move, cover up, and/or deactivate membranes to open the circuit.

A potential problem of cross contamination of feed and recovery solutions is mitigated by the use of membranes in the device and processes. Cross contamination of feed and recovery solutions may have consequences, including the complication of internal design, increased wear on components like electrodes and membranes, increased waste stream disposal problems, dilution or loss of recovery solution concentration, and impurities entering the recovery stream. Cross contamination can result in the process of carrying over impurities several times the mass of lithium recovered, limiting the efficiency of other electrochemical processes.

Significant redox efficiencies are achieved by the use of the intercalation of sodium or another cation, thus avoiding expensive chlor-alkali reactions such as evolving hydrogen, oxygen, chlorine gas, hydroxide, or other gases. Other efficiencies are obtained through re-use of water and salts in the process. The system may be operated in an Argon, Nitrogen, Air, or Carbon Dioxide atmosphere.

A system and process according to an example embodiment of the present inventive concept are described below in detail with reference to FIG. 1 and FIG. 2.

Figure 2:
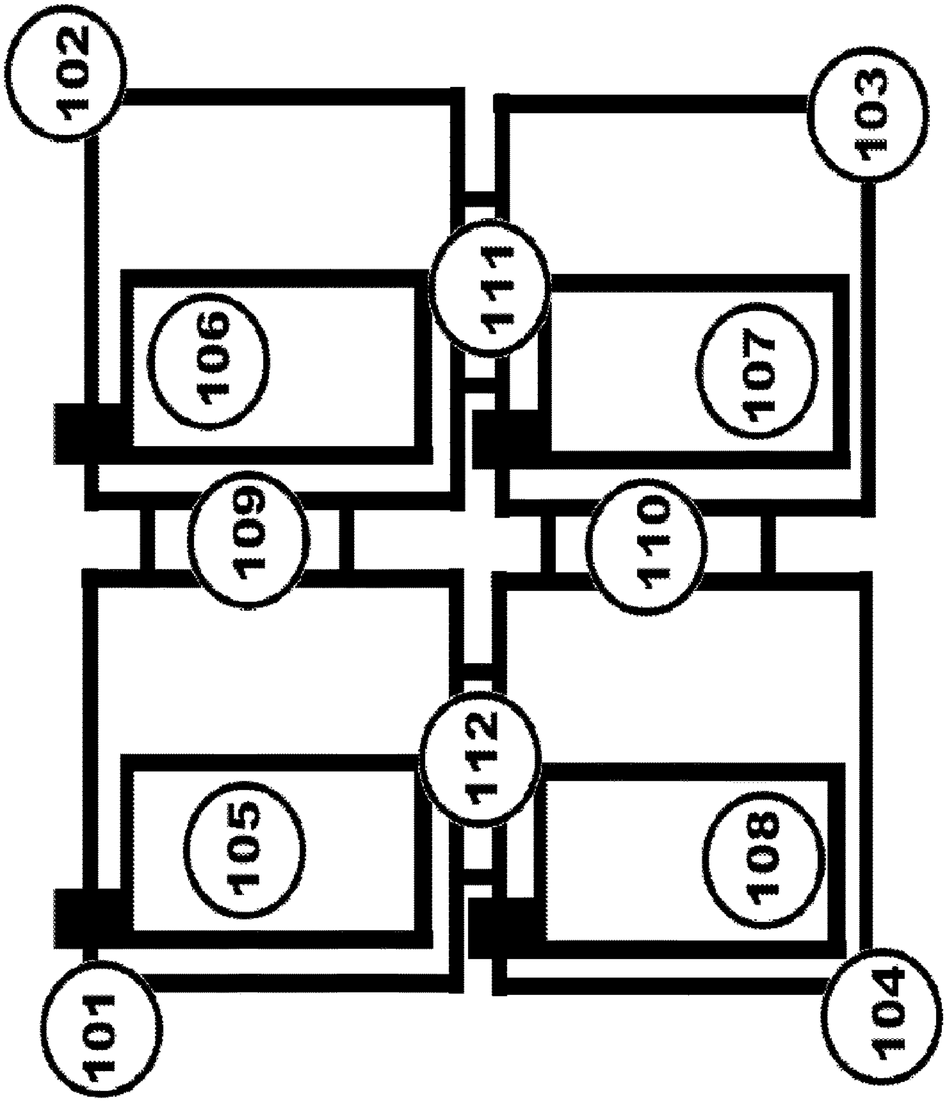
FIG. 2 illustrates another diagram of a process for purification and concentration of lithium, according to an example embodiment of the present inventive concept.

Referring to FIG. 1 and FIG. 2, a complete system consists of a continuous circuit or straight line of four or more cells. These cells are connected via alternating anion exchange membranes (AEM) and water-impermeable lithium selective conductive membranes, such as, for example (LLTO).

In the most basic form of the invention, only one electrode is charged at a time. This charged electrode is then used to charge the next electrode, and in each step moves lithium (Li) one step closer to a desired state of increasing in concentration in the recovery solution. The present inventive concept according to this example embodiment may be made more complex by increasing the number of cells indefinitely and thus increasing the number of charged electrodes, but the cycle would proceed in a conceptually identical way.

In an initial (1st) state (State 1) of the system of FIG. 1, the following status is present:

| | |
|---|---|
| Cell 101-NaCl Flushing Solution | Cell 102-No Liquid |
| Electrode 105-Discharged | Electrode 106-Discharged |
| Cell 104-LiCl Recovery Solution | Cell 103-No Liquid |
| Electrode 108-Charged with Li+ | Electrode 107-Discharged |

At this 1st state a LiCl recovery solution is in a cell 104. A cleaning/flushing NaCl (or any other non-lithium salt) solution (Brine) is in a cell 101. The system then commences the initial recovery step to charge an electrode 105 (within cell 101) with sodium (Na).

The electrode 105 is initially a discharged electrode and an electrode 108 (in cell 104) is energized to have lithium (Li) intercalated therein. A membrane 112 is a water-tight membrane which allows anions like chlorine (Cl) to pass and blocks the movement of cations like sodium (Na) and lithium (Li). The sodium (Na) is removed from the flushing solution and chlorine (Cl) transports across the anion exchange membrane 112 (AEM) from cell 101 to cell 104 while lithium (Li) delithiates from the electrode 108 for recovery and concentration in cell 104.

A 2nd state (State 2) of the system of FIG. 1 occurs after the recovery step, and the following status is present:

| | |
|---|---|
| Cell 101-Flushing Solution depleted of NaCl<br>Electrode 105-Charged with Na+ and Cl is transferred to cell 104 via the Anionic Selective Membrane 112 | Cell 102-No Liquid<br>Electrode 106-Discharged |
| Cell 104-LiCl Recovery Solution enriched with LiCl<br>Electrode 108-Discharged | Cell 103-No Liquid<br>Electrode 107-Discharged |

After the electrode 105 is charged with sodium (Na) and the electrode 108 is drained of lithium (Li), the solutions are drained. LiCl recovery solution (Li enriched) and flushing salt solution (NaCl depleted) are drained from cells 104 and 101, respectively.

Brine containing lithium (Li) to be extracted is now added to cell 101 and LiCl recovery solution is added to cell 102.

A 3rd state (State 3) of the system of FIG. 1 occurs after the fluids are changed, and the following status is present:

| | |
|---|---|
| Cell 101-Brine Naturally Containing Lithium<br>Electrode 105-Charged with Na+ | Cell 102-LiCl Recovery Solution<br>Electrode 106-Discharged |
| Cell 104-No Liquid<br>Electrode 108-Discharged | Cell 103-No Liquid<br>Electrode 107-Discharged |

The extraction step begins. Electrode 105 is discharged by discharging Na+ therefrom for exchange and an electrode 106 (in cell 102) is energized by charging it with Li+.

Sodium (Na) floods into cell 101 brine and lithium (Li) transports across the lithium selective water-impermeable membrane 109 (in this embodiment the membrane 109 is made of Lithium Lanthanum Titanium Oxide (LLTO)) and is intercalated into electrode 106.

A 4th state (State 4) of the system of FIG. 1 occurs after the Extraction Step, and the following status is present:

| | |
|---|---|
| Cell 101-Brine Naturally Containing Lithium, now depleted of lithium<br>Electrode 105-Discharged<br>Li transferred to cell 102 via Lithium Selective Membrane | Cell 102-LiCl Recovery Solution<br>Electrode 106-Charged with Li+ |
| Cell 104-No Liquid<br>Electrode 108-Discharged | Cell 103-No Liquid<br>Electrode 107-Discharged |

When the process of lithium (Li) removal from the cell 101 brine is completed, waste brine is drained from cell 101. A NaCl flushing solution is added to cell 103.

A 5th state (State 5) of the system of FIG. 1 occurs after the fluids are changed, and the following status is present:

| | |
|---|---|
| Cell 101 - No Liquid<br>Electrode 105 - Discharged | Cell 102 - LiCl Recovery Solution<br>Electrode 106 - Charged with Li+ |
| Cell 104 - No Liquid<br>Electrode 108 - Discharged | Cell 103 - NaCl Flushing Solution<br>Electrode 107 - Discharged |

The recovery step begins. An electrode 107 in cell 103 is energized with Na+ and the electrode 106 in cell 102 is discharged to delithiate captured lithium (Li). Sodium (Na) is removed from the flushing solution in cell 103 and chlorine (CI) transports across the anion exchange membrane 111 (AEM) from cell 103 to cell 102 and lithium (Li) flushes from electrode 106 for recovery and concentration.

A 6th state (State 6) occurs after the Recovery Step, and the following status is present:

| | |
|---|---|
| Cell 101 - No Liquid<br>Electrode 105 - Discharged | Cell 102 - LiCl Recovery Solution enriched with LiCl<br>Electrode 106 - Discharged |
| Cell 104 - No Liquid<br>Electrode 108 - Discharged | Cell 103 - Flushing Solution depleted of NaCl<br>Electrode 107 - Charged with Na+<br>Cl transferred to cell 102 via Anionic Selective Membrane |

LiCl recovery solution (Li enriched) and flushing salt solution (NaCl depleted) are drained from cells 102 and 103, respectively. Brine with lithium (Li) to be extracted is added to cell 103 and LiCl recovery solution is added to cell 104.

A 7th state (State 7) occurs after the fluids are changed, and the following status is present:

| | |
|---|---|
| Cell 101 - No Liquid<br>Electrode 105 - Discharged | Cell 102 - No Liquid<br>Electrode 106 - Discharged |
| Cell 104 - LiCl Recovery Solution<br>Electrode 108 - Discharged | Cell 103 - Brine Naturally Containing Lithium<br>Electrode 107 - Charged with Na+ |

An extraction step then begins. Electrode 107 is discharged by discharging sodium (Na) therefrom and electrode 108 in cell 104 is energized by charging it with Li+.

In this example embodiment, sodium (Na) floods into cell 103 brine, and lithium (Li) transports across a lithium selective membrane 110 made of Lithium Lanthanum Titanium Oxides (LLTO) into electrode 108.

An 8th state (State 8) occurs after the Extraction Step, and the following status is present:

| | |
|---|---|
| Cell 101 - No Liquid<br>Electrode 105 - Discharged | Cell 102 - No Liquid<br>Electrode 106 - Discharged |
| Cell 104 - LiCl Recovery Solution<br>Electrode 108 - Charged with Li+ | Cell 103 - Brine Naturally Containing Lithium, now depleted of lithium<br>Electrode 107 - Discharged<br>Li transferred to cell 104 via Lithium Selective Membrane |

When the process of lithium (Li) removal from the cell 103 brine is completed, waste brine is drained from cell 103. NaCl flushing solution is added to cell 101, recovering the initial state 1.

Following the previous step, the system has recovered State 1, and the following status is present:

| | |
|---|---|
| Cell 101 - NaCl Flushing Solution | Cell 102 - No Liquid |
| Electrode 105 - Discharged | Electrode 106 - Discharged |
| Cell 104 - LiCl Recovery Solution | Cell 103 - No Liquid |
| Electrode 108 - Charged with Li+ | Electrode 107 - Discharged |

This process is repeated starting from the recovery step of removing Na from the cleaning/flushing NaCL (or any other non-lithium salt) salt solution in cell 101 and recovering and concentrating the lithium chloride in cell 104.

The Lithium (Li) enriched recovery solution obtained from cell 104 and likewise from cell 102 form the output of the Direct Lithium Extraction process. With the use of optional chemical additives after this or future enrichment steps, the Lithium (Li) enriched recovery solution may consist of the forms of aqueous Lithium Chloride, Lithium Hydroxide, Lithium Carbonate, or Lithium Phosphate mixed with various impurities in different embodiments of the present inventive concept. These aqueous salts may then be purified and/or precipitated to form dry salts.

Figure 3:
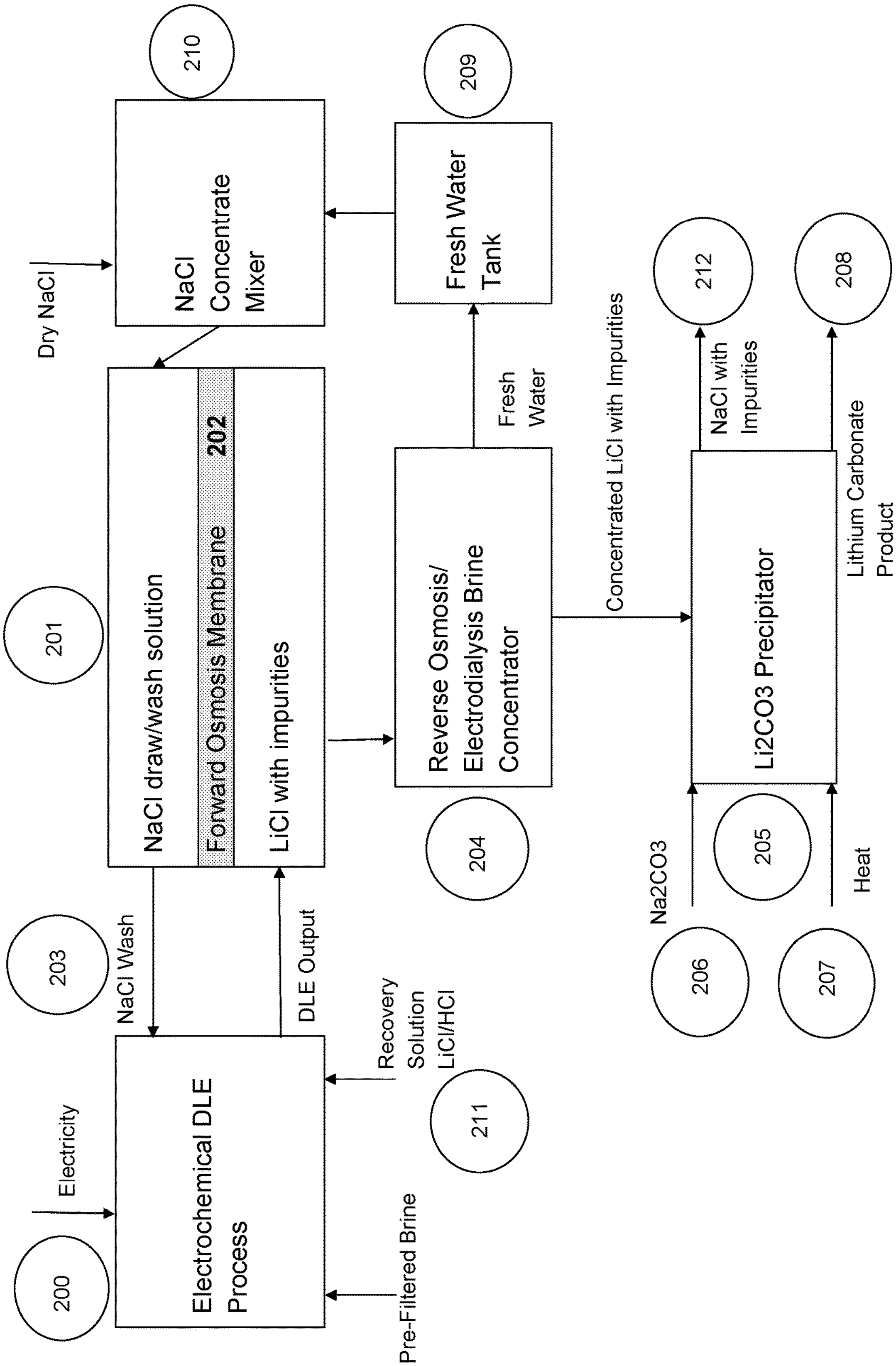
FIG. 3 illustrates a process of converting Lithium Chloride (LiCl) to Lithium Carbonate (Li2CO3), in accordance with an exemplary embodiment of the present inventive concept.

FIG. 3 illustrates a process for purification and concentration of lithium (from Lithium Chloride (LiCl) to Lithium Carbonate (Li2CO3)), according to an example embodiment of the present inventive concept, as described in detail below.

At an output of an Electrochemical Direct Lithium Extraction (DLE) process 200 from an electrochemical cell is purified Lithium chloride (LiCl), mixed with other impurities after a delithiation process. An optional step (201) to pre-concentrate the purified output from 200 can be to perform forward osmosis with a draw/wash solution. According to this example embodiment, the LiCl mixture with impurities can be placed in contact with one side of an ion-impermeable membrane (202). The other side of the ion impermeable membrane (202) is a highly concentrated NaCl draw solution. This highly concentrated NaCl draw solution drives water down its concentration gradient and out of the LiCl mixture with impurities, saving energy and reducing water in future steps. The resulting draw solution can optionally be used via step (203) to wash and intercalate the sodium electrode in the Electrochemical Ion Exchange process (200), further saving on materials costs.

In a step 204 the Reverse Osmosis Retentate (concentrated LiCl mixture with impurities) is moved to an Li2CO3 precipitator step 205. At a step 206 Sodium Carbonate (Na2CO3) is added in sufficient amounts to create Lithium Carbonate (Li2CO3) out of all the dissolved lithium (Li) in the mixture. The concentrated lithium carbonate mixture (Li2CO3) is then heated to 50-100 degrees Celsius at a step 207 in order to precipitate the concentrated lithium carbonate mixture (Li2CO3), which is performed at a step 208, which is the final salable product.

The fresh water resulting from the reverse osmosis process is stored in a fresh water tank (step 209), where it can be reclaimed for process solutions, such as a Draw Solution (step 210) for forward osmosis or stored for a Recovery Solution (LiCl with other potential additives mixture) (step (211). Draw Solution may be produced by directly adding dry salt to fresh water to a concentration above the target LiCl concentration.

Heat from the original brine may be reclaimed or recycled to precipitate the Li2CO3 in step 207.

The remaining waste product is NaCl with some lithium carbonate (see step 212) which may be returned to the reverse osmosis system, recycled as NaCl concentrate, or disposed of.

Figure 3A:
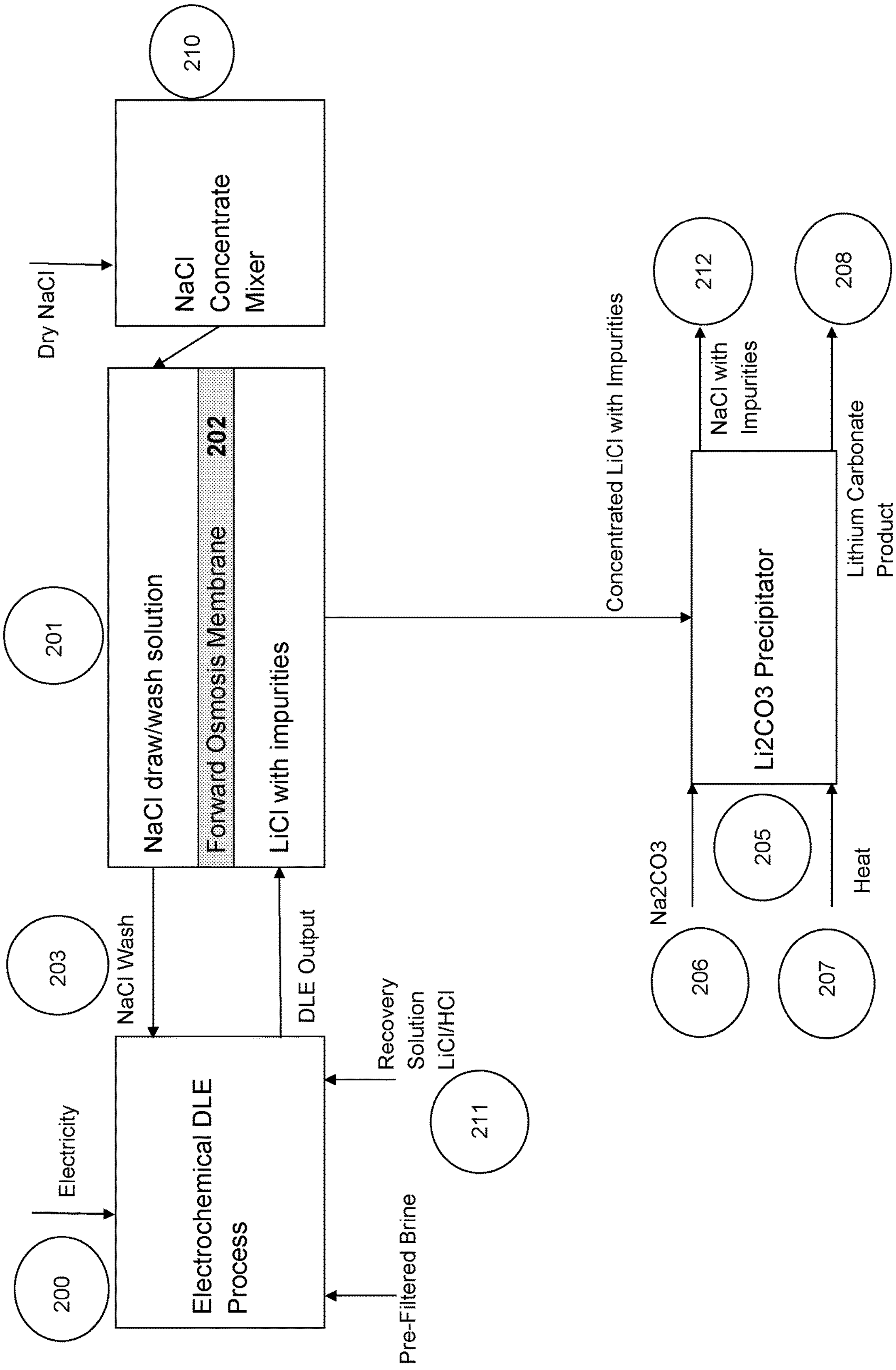
FIG. 3A illustrates a process of converting Lithium Chloride (LiCl) to Lithium Carbonate (Li2CO3), in accordance with another exemplary embodiment of the present inventive concept.

FIG. 3A illustrates a process for purification and concentration of lithium (from Lithium Chloride (LiCl) to Lithium Carbonate (Li2CO3)), according to an example embodiment of the present inventive concept. In this example embodiment, similar to the example embodiment of FIG. 3, step (201) pre-concentrates the purified output from 200 by forward osmosis with a draw/wash solution. The LiCl mixture with impurities can be placed in contact with one side of an ion-impermeable membrane (202). The other side of the ion impermeable membrane (202) is a highly concentrated NaCl draw solution. This highly concentrated NaCl draw solution drives water down its concentration gradient and out of the LiCl mixture with impurities, saving energy and reducing water in future steps. The resulting draw solution can optionally be used via step (203) to wash and intercalate the sodium electrode in the Electrochemical Ion Exchange process (200), further saving on materials costs. However, unlike the example embodiment of FIG. 3, the LiCl with impurities is moved directly to an Li2CO3 precipitator step 205. At a step 206 Sodium Carbonate (Na2CO3) is added in sufficient amounts to create Lithium Carbonate (Li2CO3) out of all the dissolved lithium (Li) in the mixture. The concentrated lithium carbonate mixture (Li2CO3) is then heated to 50-100 degrees Celsius at a step 207 in order to precipitate the concentrated lithium carbonate mixture (Li2CO3), which is performed at a step 208, which is the final salable product.

Figure 3B:
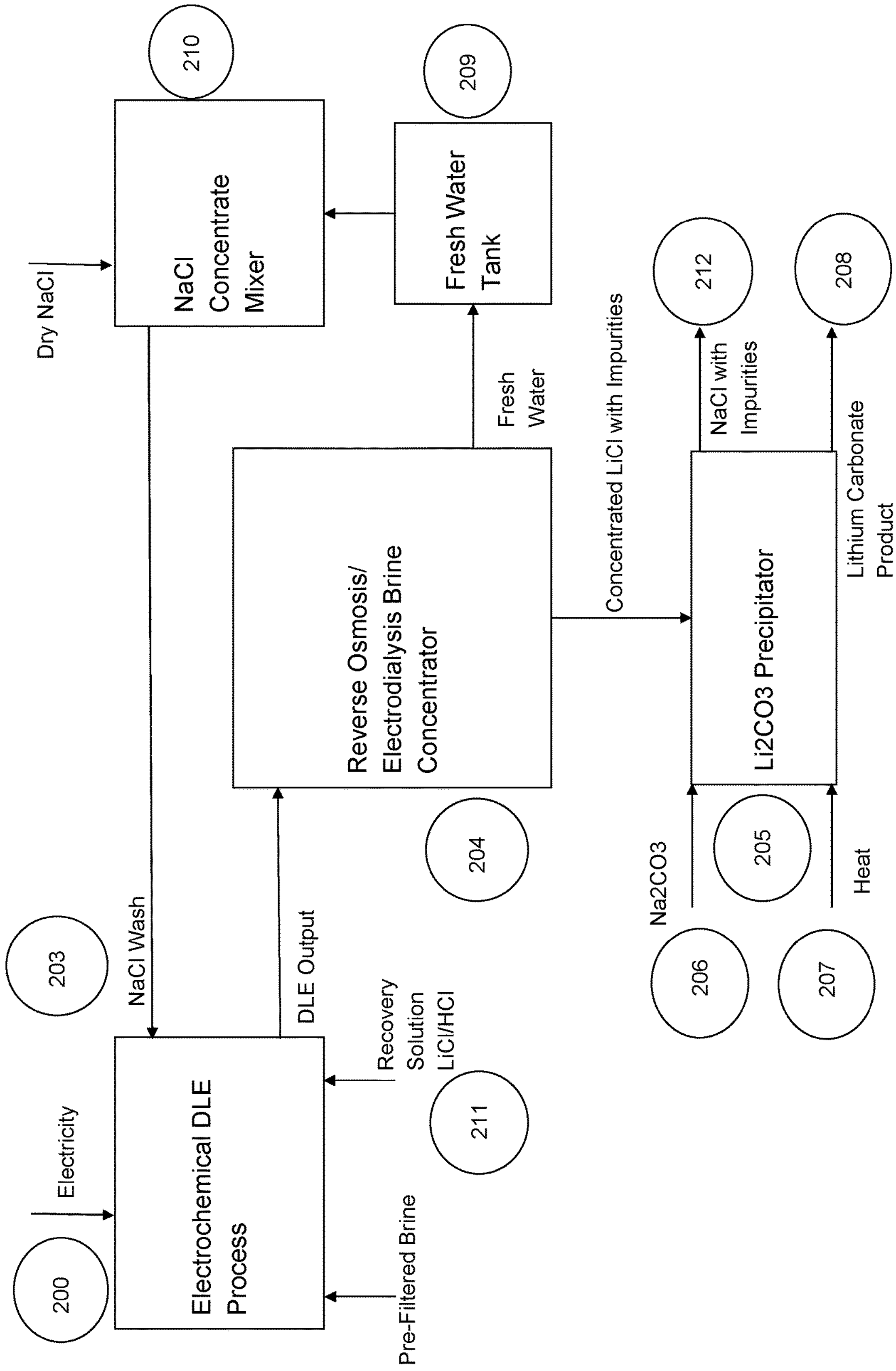
FIG. 3B illustrates a process of converting Lithium Chloride (LiCl) to Lithium Carbonate (Li2CO3), in accordance with still another exemplary embodiment of the present inventive concept.

FIG. 3B illustrates a process for purification and concentration of lithium (from Lithium Chloride (LiCl) to Lithium Carbonate (Li2CO3)), according to an example embodiment of the present inventive concept. In this example embodiment, the DLE output is moved directly to the Reverse Osmosis/Electrodialysis Brine Concentrator (204). In a step 204 the Reverse Osmosis Retentate (concentrated LiCl mixture with impurities) is moved to an Li2CO3 precipitator step 205. At a step 206 Sodium Carbonate (Na2CO3) is added in sufficient amounts to create Lithium Carbonate (Li2CO3) out of all the dissolved lithium (Li) in the mixture. The concentrated lithium carbonate mixture (Li2CO3) is then heated to 50-100 degrees Celsius at a step 207 in order to precipitate the concentrated lithium carbonate mixture (Li2CO3), which is performed at a step 208, which is the final salable product.

Figure 4:
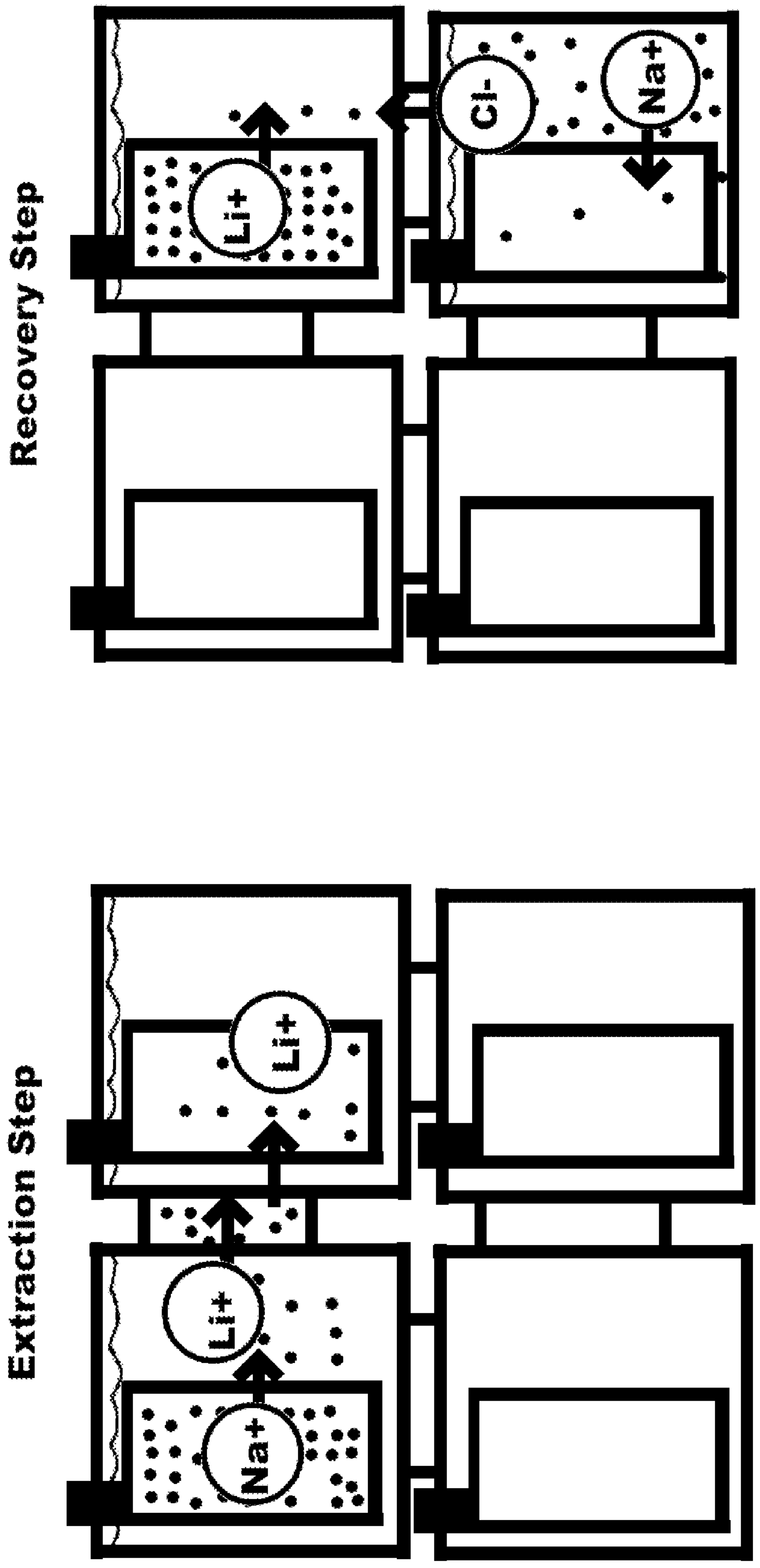
FIG. 4 illustrates the movement of ions created during different steps of a batch processing of lithium, according to an example embodiment of the present inventive concept.

FIG. 4 illustrates the movement of ions created during different steps of the batch processing. In the extraction step, sodium or another cation deintercalating from an electrode is used to drive lithium from a brine resource across a lithium selective ionically conducting membrane. On the other side of the membrane, the lithium ions are intercalated into an electrode immersed in recovery solution. In the recovery step, lithium ions are deintercalated from the electrode into the recovery solution. At the same time, the next cell is washed with a sodium chloride solution, and sodium ions are intercalated into the electrode to prepare a new extraction step. Chloride ions are driven across an anionic conductive membrane, pairing with the newly freed lithium ions.

Alternate Arrangements

Figure 5:
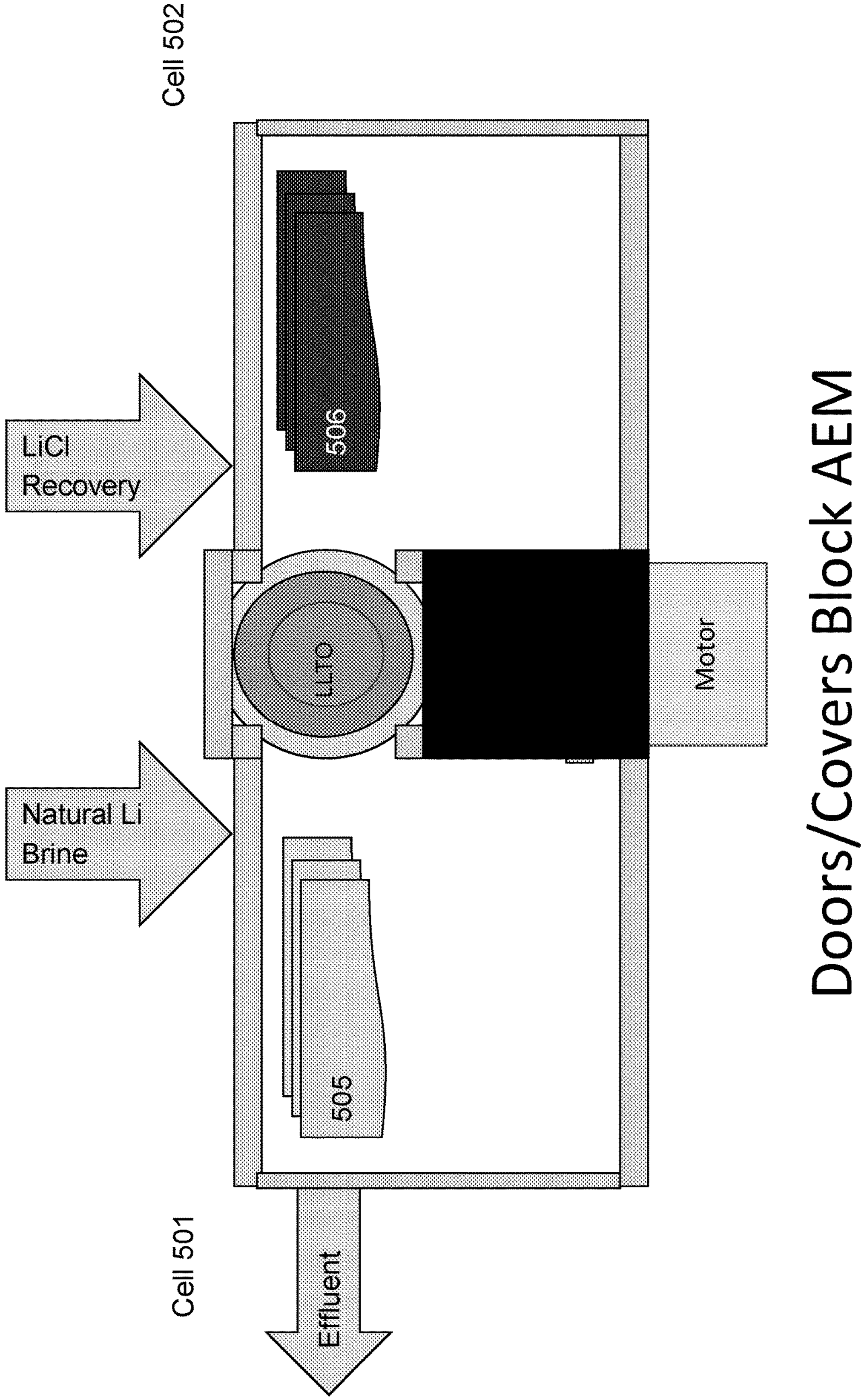
FIG. 5 illustrates an extraction process according to another example embodiment of a process for purification and concentration of lithium.
Figure 6:
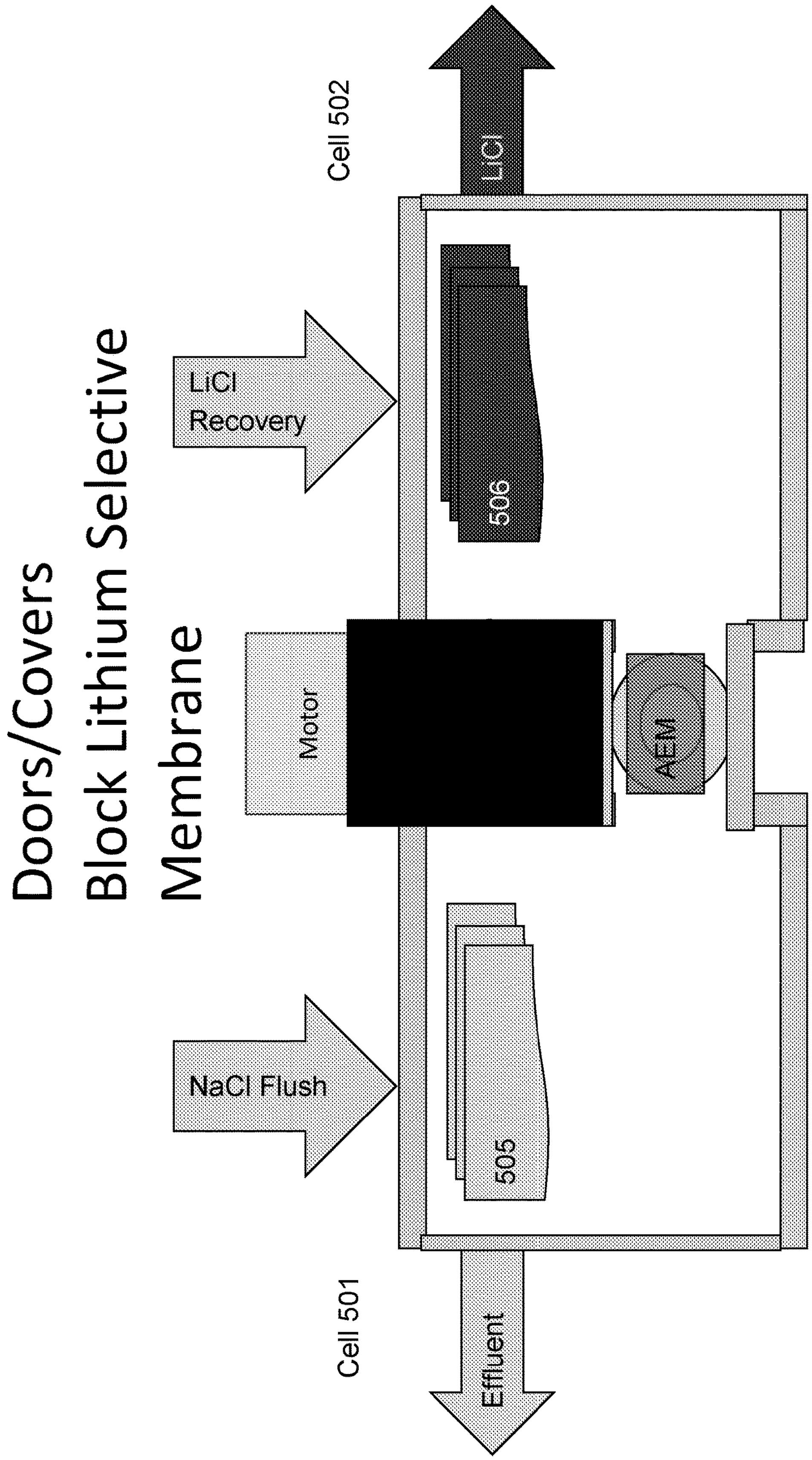
FIG. 6 illustrates a recovery process according to the example embodiment of FIG. 5.

FIG. 5 and FIG. 6 illustrate an alternative system and process according to another example embodiment of the present inventive concept.

FIG. 5 illustrates a different example embodiment of the present inventive concept than described above. The present inventive concept according to this example embodiment may be constructed with the same operating principle of exchanging Na+ for Li+, but only utilizing two cells, if movable parts are incorporated into the system. These movable parts can selectively insulate the membranes from the ionic circuit to enable the Extraction and Recovery steps to occur without changing into new cells. This process can occur using linear or rotary motion to cover, uncover, remove, or insert the membranes.

Referring to FIG. 5, during the Extraction Step, a Cell 501 contains a brine naturally containing lithium, a cell 502 contains a recovery solution, and the anionic selective membrane is mechanically isolated from the circuit, as illustrated in FIG. 5. Deintercalating sodium (Na) from an electrode 505 causes lithium (Li) to transport across the lithium selective membrane (LLTO) to intercalate into an electrode 506.

Alternate Arrangement 1 State 1.

| | |
|---|---|
| Cell 501 - Brine Naturally Containing Lithium<br>Electrode 505 - Charged with Na+<br>Lithium Selective Membrane Active | Cell 502 - LiCl Recovery Solution<br>Electrode 506 - Discharged<br>Lithium Selective Membrane Active |

Alternate Arrangement 1 State 2

| | |
|---|---|
| Cell 501 - Brine Naturally Containing Lithium, now depleted of lithium<br>Electrode 505 - Discharged<br>Lithium Selective Membrane Active<br>Li transferred to cell 502 via Lithium Selective Membrane | Cell 502 - LiCl Recovery Solution<br>Electrode 506 - Charged with Li+<br>Lithium Selective Membrane Active |

During the Recovery Step, a cell 501 contains NaCl flushing solution, a cell 502 contains recovery solution, and the lithium selective membrane is mechanically isolated from the circuit, as illustrated in FIG. 6. Deintercalating lithium from an electrode 506 causes sodium (Na) to intercalate into an electrode 505 and chlorine (Cl) to transport across an anion exchange membrane (AEM). This process enriches the recovery solution with lithium chloride (LiCl) and Electrode 505 is energized to start a new Extraction Step.

Alternate Arrangement 1 State 3

| | |
|---|---|
| Cell 501 - NaCl Flushing Solution<br>Electrode 505 - Discharged<br>Anionic Selective Membrane Active | Cell 502 - LiCl Recovery Solution<br>Electrode 506 - Charged with Li+<br>Anionic Selective Membrane Active |

Alternate Arrangement 1 State 4

| | |
|---|---|
| Cell 501 - Flushing Solution depleted of NaCl<br>Electrode 505 - Charged with Na+<br>Anionic Selective Membrane Active<br>Cl transferred to cell 502 via Anionic Selective Membrane | Cell 502 - LiCl Recovery Solution enriched with LiCl<br>Electrode 106 - Discharged<br>Anionic Selective Membrane Active |

Figure 7:
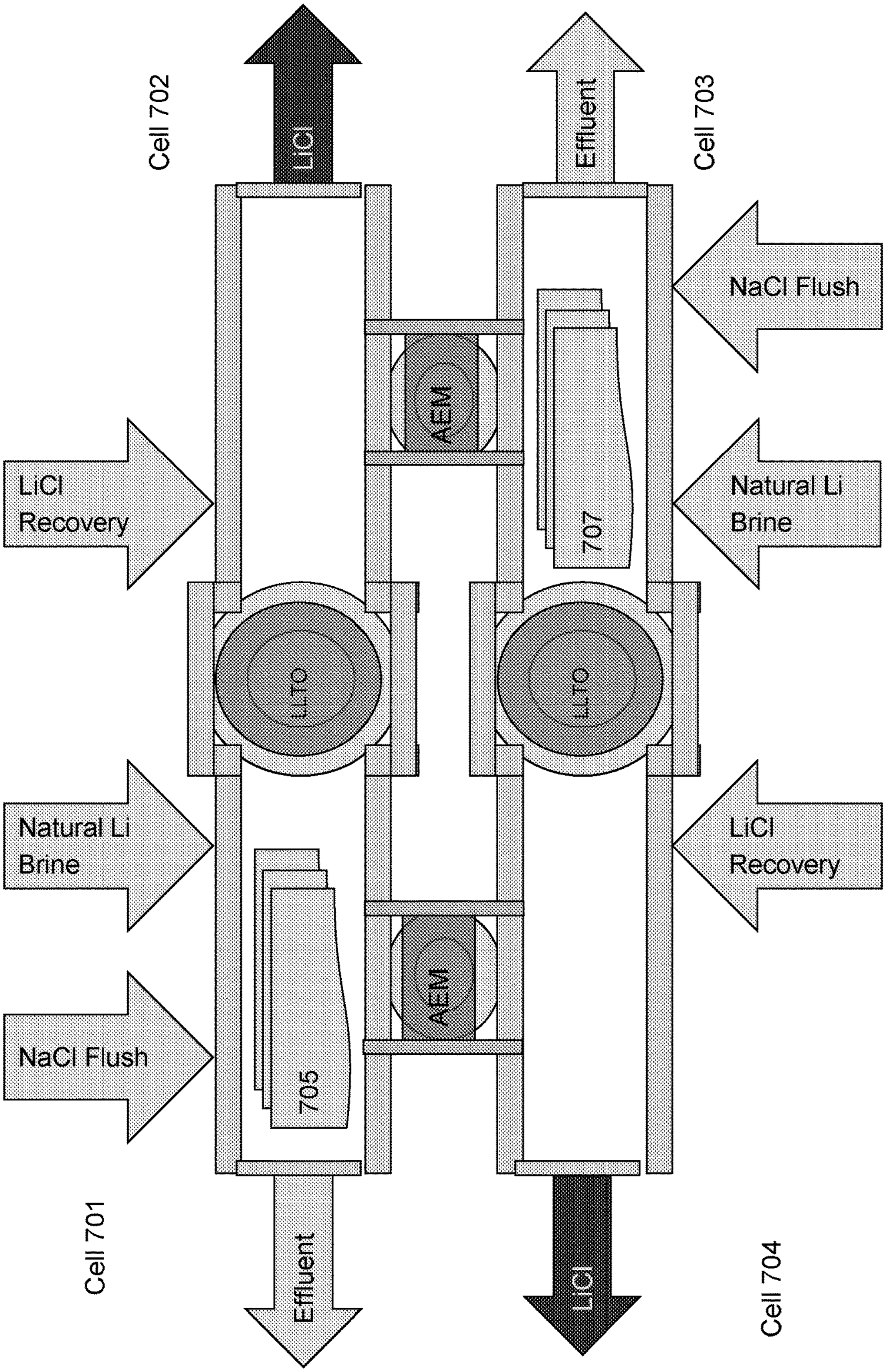
FIG. 7 illustrates yet another example embodiment of a process for purification and concentration of lithium.

FIG. 7 illustrates an Alternate Arrangement according to another example embodiment of the present inventive concept. This example embodiment may be constructed with the same operating principle of exchanging Na+ for Li+, but with the use of only two electrodes, wherein second and fourth cells do not contain electrodes (see FIG. 7). The redox reaction is then driven by electrodes 705 and 707, disposed in first cell 701 and third cell 703, respectively. The two electrodes 705 and 707 will run the Extraction and Recovery steps simultaneously, pushing Li across a Lithium selective membrane (LLTO) at the same time Chloride (Cl) comes across an Anionic selective membrane (AEM). When electrode 705 is running the extraction step, electrode 707 is running the recovery step, and a second cell 702 is becoming enriched. When the electrode 707 is running the extraction step, electrode 705 is running the recovery step, and a cell 704 is becoming enriched.

Alternate Arrangement 2—Initial State-State 1

| | |
|---|---|
| Cell 701 - Brine Naturally Containing Lithium<br>Electrode 705 - Charged with Na+ | Cell 702 - LiCl Recovery Solution |
| Cell 704 - No Liquid | Cell 703 - NaCl Flushing Solution<br>Electrode 707 - Discharged |

Alternate Arrangement 2—State 2

| | |
|---|---|
| Cell 701 - Brine Naturally Containing Lithium, depleted of lithium<br>Electrode 705 - Discharged<br>Li transferred to cell 702 via Lithium Selective Membrane | Cell 702 - LiCl Recovery Solution, enriched with Lithium |
| Cell 704 - No Liquid | Cell 703 - NaCl Flushing Solution, depleted of sodium (Na)<br>Electrode 707 - Charged with Na+<br>Cl transferred to cell 702 via Anionic Selective Membrane |

Alternate Arrangement 2—State 3

| | |
|---|---|
| Cell 701 - NaCl Flushing Solution<br>Electrode 105 - Discharged | Cell 702 - No Liquid |
| Cell 704 - LiCl Recovery Solution | Cell 703 - Brine Naturally Containing Lithium<br>Electrode 707 - Charged with Na+ |

Alternate Arrangement 2—State 4

| | |
|---|---|
| Cell 701 - NaCl Flushing Solution<br>Electrode 705 - Charged with Na+<br>Cl transferred to cell 104 via Anionic Selective Membrane | Cell 702 - No Liquid |
| Cell 704 - LiCl Recovery Solution, enriched with Lithium | Cell 703 - Brine Naturally Containing Lithium, depleted of lithium<br>Electrode 707 - Discharged<br>Li transferred to cell 704 via Lithium Selective Membrane |

These alternate arrangements may be employed, and though they may exhibit different performance characteristics, operating efficiencies, and ease of manufacture, the process used to enrich lithium from a brine is nonetheless conceptually similar and driven by the de-intercalation of a cation pushing lithium across a membrane.

The Electrode Design

The overall cell will behave much like a flow cell battery. Intercalation and De-intercalation of sodium or other cations at the anode are an extremely attractive half-reaction from a cost perspective. The device would essentially be trading one sodium atom for one lithium atom (a trade of around $0.05-$1 worth of sodium for $20-$80 worth of lithium at current lithium carbonate prices). In environments like the Great Salt Lake, where NaCl salt is nearly free, the economics of this trade are even more appealing. At the cathode, a redox reaction of lithium intercalation is attractive from the point of view of avoiding changes in solution pH, although evolution of hydrogen and hydroxide are also possible, though less appealing options from an energy consumption perspective.

Electrodes for intercalating sodium and lithium may be made of pure graphite, or graphite with surface or volume treatments to increase the electrode's affinity towards other elements. Such electrodes may be treated with FePO4, Mn2O4, S, or other similar materials which assist in intercalation of cations.

Flow cells often have porous graphite electrodes which feature significantly enhanced surface area. Alternately, multiple sheets, plates or other geometric arrangements can serve as the structure for which ion exchange is initiated. The electrodes are treated with Lithium Manganese Oxide or Lithium Iron Phosphate powders to increase their capacity to hold both lithium and sodium. The density of powder can be in the range from 1-200 mg/cm2.

The sheet electrode design may be of many different thicknesses, from less than a tenth of a millimeter to hundreds of millimeters depending on the design objectives.

The cost of the structural graphite is nearly 90% of the cost of the electrode. The treatment powders such as Lithium Iron Phosphate and Lithium Manganese Oxide, however, contribute the most to system performance. Graphite's role is mainly in providing surface area and structure. Work using electrodes alone to extract lithium have used both Lithium Iron Phosphate and Lithium Manganese Oxide. The quantity of lithium extracted can reach 40 mg Li per 1 g of LiFePO4 (see "Effect of Na+ on Li extraction from brine using LiFePO4/FePO4 electrodes" *XH Liu, XY Chen, ZW Zhao, XX Liang* 2014). Since Li contributes around 43 mg of the mass of LifePO4, this indicates the sodium electrode process is close to as mass efficient as possible for driving lithium extraction.

It is to be noted that these electrodes may alternatively be composed of platinum or its alloys, carbon or metallic foams, or other metals such as iron, silver, aluminum, zinc, or copper.

Cationic Selective Membrane Design

Cationic selective Membranes are a solid lithium electrolyte. They may be made of ceramic, polymer, or a composite.

Glass or ceramic materials are gaining significant traction as a lithium-selective membrane in aqueous electrochemical lithium extraction applications. Specific formulations of these materials allow lithium to pass through while rejecting other elements. Typical conductivities are on the order of 10^−4 to 10^−3 S/cm for lithium ions.

The cationic selective membranes may be at least partially composed of a glass or ceramic with titanate or garnet composition, such as $Li_vLa_wTiO_z$, $Li_vLa_wZr_xO_z$, or $Li_vLa_wZr_xTa_yO_z$. The cationic selective membrane may be surface treated with a lithium conducting organic molecule. A material with similar lithium conductivity and selectivity such as Lithium Aluminum Titanium Phosphate, Lithium Aluminum Germanium Phosphate, or Lithium Aluminum Titanium Oxide may be substituted to similar effect.

The cationic selective membrane may be composed of, or surface treated with a lithium selective polymer. The cationic selective membrane may alternatively be composed of, or surface treated with a carbon fiber material. The cationic selective membrane may alternatively be composed of, or surface treated with a lithium conducting salt, such as, for example LiTFSI.

The electric field across the cationic selective membrane can only be completed by the flow of lithium ions. Thus, in the brine, sodium ions are released from the electrode and lithium ions are transferred into the membrane. On the recovery side, lithium ions are transferred into a solution and then absorbed into the counter electrode to complete the electric circuit.

Electrochemical Cells:

Electrochemical cells are made of an inert plastic shell or liner, such as PTFE or PVDF. They are made water-tight via the use of compression and gaskets or O-rings. They contain ports to fit membranes between cells and ports for input and output of fluids.

Some of the many advantages of the electrochemical methods according to the present general inventive concept include the following:

1) By producing lithium using electrochemical extraction, it will make the lithium market immune to production shocks due to weather events and other supply disruptions domestically and internationally;
2) customers will gain the ability to develop proven brine resources and our technology will make new resources economical;
3) electrochemical methods will eventually offer superior scalability versus ion exchange and adsorption DLE methods. The first reason is that electrochemical methods will require less fine tuning with respect to target brines and present a more general solution to the problem of refining lithium from low grade brines. The second reason is that a body of knowledge exists and can be tapped into by repurposing battery manufacturing methods for scale up of an electrochemical product;
4) the present inventive process will further enable the reclamation of locally useful non-lithium resources such as salts and fresh water, which can be re-used in the process for more lithium extraction or sold to local companies; and
5) while current commercially available lithium extraction and refining technology requires a minimum lithium concentration ranging from 168 ppm-485 ppm, tests conducted by the inventors of the present inventive concept can successfully drive lithium concentration from a minimum of 5 ppm-20 ppm, meaning the system as described herein is competitive with world class technologies.

Testing Data

Electrode testing in lithium chloride solutions. 1 gram of lithium is moved per 3.86 Amp-hours. The higher the current, the more lithium is extracted. The circuit consists of: power electronics-electrode 1-source electrolyte solution-membrane-recovery electrolyte solution-electrode 2. Resistances are in series.

Treated and untreated graphite electrodes were tested in varying lithium chloride concentrations to test resistance to lithium current flows at an applied+−1 volt:

Untreated Control: Lithium current from cyclic voltammetry, results from untreated graphite electrodes

| Electrode 1 | Electrode 2 | Height of Electrode in water | LiCl concentration (mg/L) | Li Concentration (mg/L) | Voltage (V) | Current (mA) | Resistance (ohms) |
|---|---|---|---|---|---|---|---|
| Graphite | Graphite | | 200 | 32.738 | 1 | 0.68 | 1470.588 |
| Graphite | Graphite | | 200 | 32.738 | −1 | −0.925 | 1081.081 |
| Graphite | Graphite | 66 mm | 1222 | 200 | 1 | 2.68 | 373.134 |
| Graphite | Graphite | 66 mm | 1222 | 200 | −1 | −2.33 | 429.185 |
| Graphite | Graphite | 66 mm | 2444 | 400 | 1 | 2.4 | 416.667 |
| Graphite | Graphite | 66 mm | 2444 | 400 | −1 | −3.3 | 303.030 |

Treatment: Lithium Current from Cyclic Voltammetry, Results from LiFePO4 treated graphite electrodes. Treated electrodes show a significantly reduced resistance to lithium current in LiCl solution even at dilute concentrations. Resistance remains below untreated electrodes all the way to 20 parts per million.

| Electrode 1 | Electrode 2 | Height of Electrode in water | LiCl concentration (mg/L) | Li Concentration (mg/L) | Voltage (V) | Current (mA) | Resistance (ohms) |
|---|---|---|---|---|---|---|---|
| LFP 35 × 120 | LFP 35 × 120 | 66 mm | 30.545 | 5 | 1 | 1.4 | 714.285 |
| LFP 35 × 120 | LFP 35 × 120 | 66 mm | 30.545 | 5 | −1 | −1.44 | 694.444 |
| LFP 35 × 120 | LFP 35 × 120 | 66 mm | 122 | 20 | 1 | 3.704 | 269.978 |
| LFP 35 × 120 | LFP 35 × 120 | 66 mm | 122 | 20 | −1 | −3.86 | 259.067 |
| LFP 35 × 120 | LFP 35 × 120 | 66 mm | 305 | 50 | 1 | 8.01 | 124.844 |
| LFP 35 × 120 | LFP 35 × 120 | 66 mm | 305 | 50 | −1 | −8.91 | 112.233 |
| LFP 35 × 120 | LFP 35 × 120 | 66 mm | 1222 | 200 | 1 | 16.899 | 59.175 |
| LFP 35 × 120 | LFP 35 × 120 | 66 mm | 1222 | 200 | −1 | −19.256 | 51.932 |
| LFP 35 × 120 | LFP 35 × 120 | 66 mm | 2444 | 400 | 1 | 23.51 | 42.535 |
| LFP 35 × 120 | LFP 35 × 120 | 66 mm | 2444 | 400 | −1 | −26.52 | 37.707 |

Figure 8:
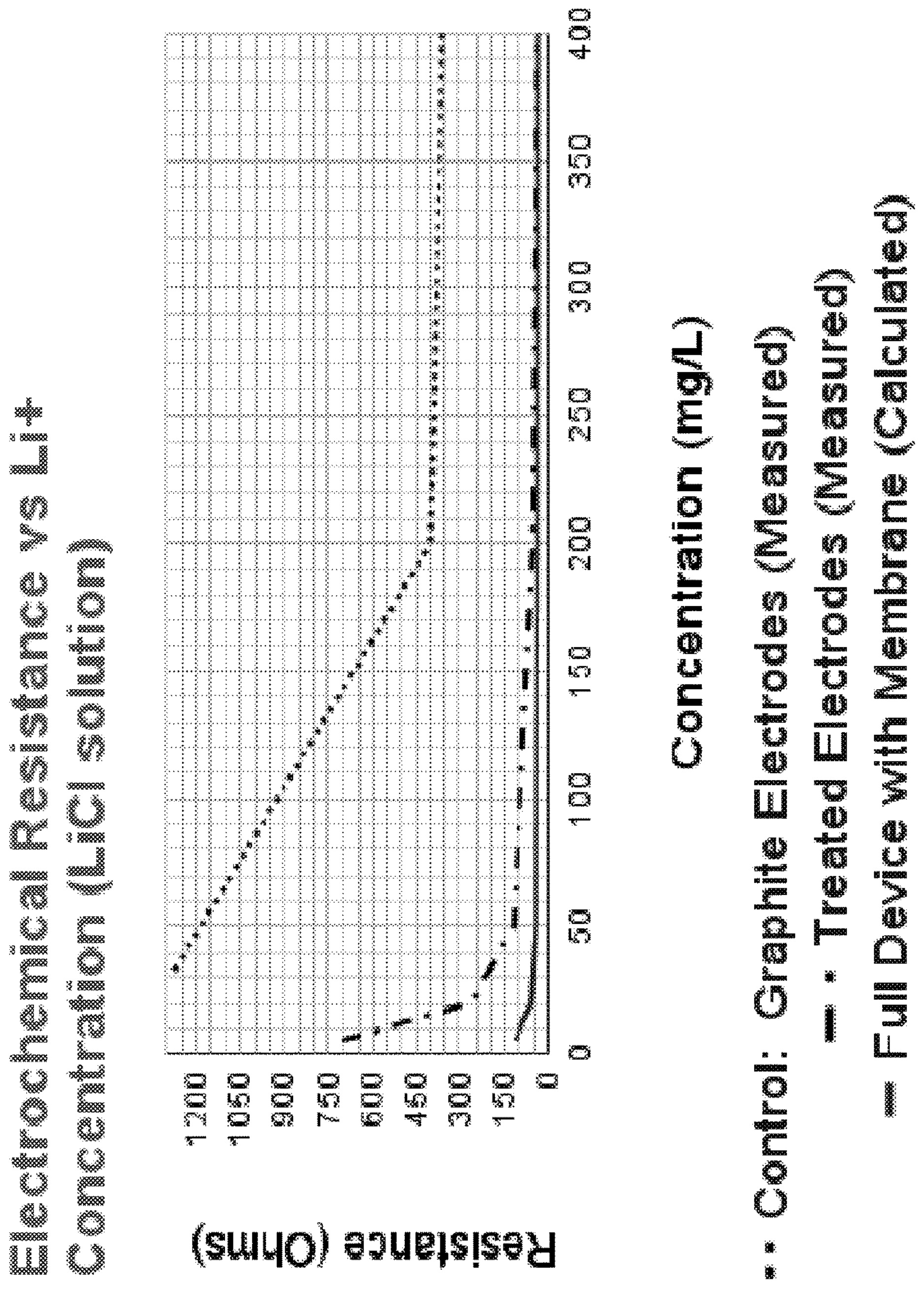
FIG. 8 illustrates a graph of Electrochemical Resistance vs. Li+ Concentration (LiCl solution), according to an example embodiment of the present inventive concept.

Scaling factor for full device: the electrode size is scaled from 66×35 to 127×76.2, and the treatment is doubled on the rear side of the electrode, doubling the area. We further add the membrane resistance into the calculation (derived in the next section). The electrochemical extraction method shows low, flat resistance from 20 ppm-400 ppm (i.e. clear 90% extraction efficiency from 200 ppm) and a still reasonable 113 ohms at 5 ppm. See FIG. 8 graph of Electrochemical Resistance vs. Li+ Concentration (LiCl solution).

Membrane Resistance Testing

Solid electrolyte membrane materials were tested using Electrochemical Impedance Spectroscopy to calculate resistance/conductivity to lithium flow. The X-intercept on the real impedance axis of the Nyquist plot is normalized by the area and thickness of the membrane. The thinner the membrane, the lower the resistance.

Li0.33 La0.56 Ti O3 Electrochemical Impedance Spectroscopy measurements.

| Material | Area (mm2) | Thickness (mm) | Measured Resistance | Conductance (S/cm) |
|---|---|---|---|---|
| Li0.33 La0.56 Ti O3 | 72.18665 | 0.66 | 1798 | 5.09E−05 |
| Li0.33 La0.56 Ti O3 | 53.0631 | 0.52 | 1724 | 5.68E−05 |
| Li0.33 La0.56 Ti O3 | 29.2937 | 0.54 | 1873 | 9.84E−05 |
| Li0.33 La0.56 TiO3 | 59.9739 | 0.68 | 1571 | 7.22E−05 |

Li6.4 La3 Zr1.4 Ta0.6 O12 Electrochemical Impedance Spectroscopy measurements

| | Area (mm2) | Thickness (mm) | Measured Resistance | Conductance (S/cm) |
|---|---|---|---|---|

-continued

| | | | | |
|---|---|---|---|---|
| Li6.4 La3 Zr1.4 Ta0.6 O12 | 31.164 | 0.58 | 1363 | 1.37E−04 |
| Li6.4 La3 Zr1.4 Ta0.6 O12 | 16.605 | 0.56 | 910 | 3.71E−04 |
| Li6.4 La3 Zr1.4 Ta0.6 O12 | 23.217 | 0.79 | 4314 | 7.89E−05 |
| Li6.4 La3 Zr1.4 Ta0.6 O12 | 39.228 | 0.63 | 2046 | 7.85E−05 |
| Li6.4 La3 Zr1.4 Ta0.6 O12 | 16.1507 | 0.51 | 1652 | 1.91E−04 |
| Li6.4 La3 Zr1.4 Ta0.6 O12 | 31.7254 | 0.48 | 1528 | 9.90E−05 |
| Li6.4 La3 Zr1.4 Ta0.6 O12 | 31.164 | 0.58 | 1363 | 1.37E−04 |

| Membrane Material (50 mm diameter membrane) | Test | Measured Total Li Conductivity | 500 μm Film |
|---|---|---|---|
| Lithium Lanthanum Titanium Oxide (LLTO) | Electrochemical Impedance Spectroscopy | 7.30E−05 S/cm | 54.51 Ω |
| Lithium Lanthanum Zirconium Tantalum Oxide (LLZTO) | Electrochemical Impedance Spectroscopy | 1.35E−04 S/cm | 29.56 Ω |
| LLZTO Projected Extraction Performance @ 50 ppm | | | 165 g $Li_2CO_3$/year |

At present capability, a single four cell device is projected to extract 165 g of Li2CO3 per year at 50 ppm.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of purifying and concentrating lithium (Li), the method comprising:

connecting a first cell having a first electrode therein to a second cell having a second electrode therein by disposing a first water-impermeable lithium selective conductive membrane therebetween;

connecting a third cell having a third electrode therein to a fourth cell having a fourth electrode therein by disposing a second water-impermeable lithium selective conductive membrane therebetween;

connecting the first cell to the fourth cell by disposing a first anion exchange membrane (AEM) therebetween;

connecting the second cell to the third cell by disposing a second anion exchange membrane (AEM) therebetween;

filling the first cell with an NaCl flushing solution and filling the fourth cell with an LiCl recovery solution such that upon application of a voltage the fourth electrode discharges Li+, the Na is removed from the NaCl flushing solution into the first electrode to charge the first electrode with Na+ and the Cl transports across the first AEM from the first cell to the fourth cell;

draining the Li+ enriched LiCl recovery solution from the fourth cell and flushing the NaCl depleted NaCl solution from the first cell;

adding brine containing Li to the first cell and applying a voltage to the first electrode to discharge Na+ from the first electrode therefrom and LiCl recovery solution to the second cell and a voltage to charge the second electrode with Li while Li transports across the first water-impermeable lithium selective conductive membrane from the first cell to intercalate into the second electrode to charge the second electrode with Li+;

then draining the waste brine from the first cell;

adding an NaCl flushing solution to the third cell to charge the third electrode with Na+ while Cl transports across the second AEM from the third cell to the second cell;

discharging the second electrode to delithiate the Li+ for recovery and concentration of Li;

draining Li enriched LiCl recovery solution from the second cell and flushing NaCl depleted NaCl solution from the third cell;

adding brine solution with Li to the third cell and LiCl recovery solution to the fourth cell to energize the fourth electrode with Li while Li transports across the second water-impermeable lithium selective conductive membrane from the third cell to the fourth electrode;

discharging Na from the third electrode while the fourth electrode is charged with Li+; and draining waste brine solution from the third cell and adding NaCl flushing solution to the first cell.

2. The method of purifying and concentrating lithium (Li) according to claim 1, wherein the first and second water-impermeable lithium selective conductive membranes are made of Lithium Lanthanum Titanium Oxide (LLTO).

3. The method of purifying and concentrating lithium (Li) according to claim 1, wherein the first and second water-impermeable lithium selective conductive membranes are made of one of Lithium Lanthanum Zirconium Tantalum Oxide LLZTO, Lithium Aluminum Titanium Phosphate LATP, Lithium Aluminum Germanium Phosphate LAGP, Lithium Aluminum Titanium Oxide LATO, or composite electrodes incorporating polymers, or composite electrodes incorporating lithium containing conducting salt.

4. The method of purifying and concentrating lithium (Li) according to claim 1, further comprising:

placing the LiCl mixture in contact with a first side of an ion-impermeable membrane while placing a highly concentrated NaCl draw solution in contact with a second side of the ion-impermeable membrane to drive water down the concentration gradient and out of the LiCl mixture;

placing the LiCl mixture into a reverse osmosis/electrodialysis brine concentrator to concentrate the LiCl with impurities and to draw out fresh water therefrom;

placing the LiCl mixture with impurities from the reverse osmosis/electrodialysis brine concentrator in an Li2CO3 precipitator;

adding Sodium Carbonate (Na2CO3) to the Li2CO3 precipitator with the LiCl mixture to create Lithium Carbonate (Li2CO3) from the dissolved Li in the mixture; and heating the concentrated lithium carbonate mixture (Li2CO3) to 50-100 degrees Celsius to precipitate the concentrated lithium carbonate mixture (Li2CO3).

5. The method of purifying and concentrating lithium (Li) according to claim 4, wherein the water obtained from the water driven down the concentration gradient is added to the highly concentrated NaCl draw solution or added to the LiCl recovery solutions.

6. The method of purifying and concentrating lithium (Li) according to claim 4, wherein remaining waste product NaCl with some lithium carbonate from the precipitate is recycled as NaCl concentrate.

7. The method of purifying and concentrating lithium (Li) according to claim 1, further comprising:

placing the LiCl mixture in contact with a first side of an ion-impermeable membrane while placing a highly concentrated NaCl draw solution in contact with a second side of the ion-impermeable membrane to drive water down the concentration gradient and out of the LiCl mixture;

placing the concentrated LiCl mixture with impurities in an Li2CO3 precipitator;

adding Sodium Carbonate (Na2CO3) to the Li2CO3 precipitator with the LiCl mixture to create Lithium Carbonate (Li2CO3) from the dissolved Li in the mixture; and heating the concentrated lithium carbonate mixture (Li2CO3) to 50-100 degrees Celsius to precipitate the concentrated lithium carbonate mixture (Li2CO3).

8. The method of purifying and concentrating lithium (Li) according to claim 1, further comprising:

placing the LiCl mixture through a reverse osmosis/electrodialysis brine concentrator to concentrate the LiCl and draw out water therefrom;

placing the concentrated LiCl mixture in an Li2CO3 precipitator;

adding Sodium Carbonate (Na2CO3) to the Li2CO3 precipitator with the LiCl mixture to create Lithium Carbonate (Li2CO3) from the dissolved Li in the mixture; and heating the concentrated lithium carbonate mixture (Li2CO3) to 50-100 degrees Celsius to precipitate the concentrated lithium carbonate mixture (Li2CO3).

9. The method of purifying and concentrating lithium (Li) according to claim 8, wherein the water obtained from the water driven down the concentration gradient is added to the highly concentrated NaCl draw solution or added to the LiCl recovery solutions.

10. The method of purifying and concentrating lithium (Li) according to claim 8, wherein remaining waste product NaCl with some lithium carbonate from the precipitate is recycled as NaCl concentrate.

11. A method of purifying and concentrating lithium (Li), the method comprising:

connecting a first cell having a first electrode therein to a second cell having a second electrode therein by disposing a water-impermeable lithium selective conductive membrane therebetween;

fill the first cell with NaCl flushing solution to charge the first electrode with Na+;

filling a first cell with a brine naturally containing Li;

filling a second cell with an LiCl recovery solution;

deintercalating Na from the first electrode the cause Li to transport across the first water-impermeable lithium selective conductive membrane to intercalate into the second electrode;

draining the first cell of brine depleted of Li;

isolating the water-impermeable lithium selective conductive membrane from the first and second cells;

connecting a anion exchange membrane (AEM) between the first cell and the second cell;

fill the first cell with NaCl flushing solution; and deintercalating Li from the second electrode to cause Na to intercalate into the first electrode, to transport Cl across the AEM, to enrich the LiCl recovery solution in the second cell and to charge the first electrode with Na+.

12. The method of purifying and concentrating lithium (Li) according to claim 11, wherein the water-impermeable lithium selective conductive membrane is made of Lithium Lanthanum Titanium Oxide (LLTO).

13. A method of purifying and concentrating lithium (Li), the method comprising:

connecting a first cell having a first electrode therein to a second cell by disposing a first water-impermeable lithium selective conductive membrane therebetween;

connecting a third cell having a second electrode therein to a fourth cell by disposing a second water-impermeable lithium selective conductive membrane therebetween;

connecting the first cell to the fourth cell by disposing a first anion exchange membrane (AEM) therebetween;

connecting the second cell to the third cell by disposing a second anion exchange membrane (AEM) therebetween;

filling the first cell with a brine naturally containing Li and applying a voltage to discharge the first electrode of Na+ therefrom while Li transports across the first water-impermeable lithium selective conductive membrane from the first cell into the second cell and enrich the second cell with Li+;

filling the second cell with an LiCl recovery solution; adding an NaCl flushing solution to the third cell while applying a voltage to charge the second electrode with Na+ while Cl transports across the second AEM from the third cell to the second cell, thus causing the NaCl solution in the third cell to be depleted of Na+ and Cl;

draining fluids from the first cell (waste brine), the second cell (Li enriched), and the third cell (waste flush);

adding brine with naturally occurring Li to the third cell while applying a voltage to the second electrode to discharge Na+ therefrom such that Li transports across the second water-impermeable lithium selective conductive membrane to the fourth cell;

adding LiCl recovery solution to the fourth cell to enrich the LiCl recovery solution with Li+;

adding NaCl flushing solution to the first cell while applying a voltage to charge the first electrode with Na+ while Cl transports across the second AEM from the first cell to the fourth cell, thus causing the NaCl solution in the first cell to be depleted of Na+ and Cl; and draining fluids from the first cell (waste flush), the third cell (waste brine), and the fourth cell (Li enriched).

14. The method of purifying and concentrating lithium (Li) according to claim 13, wherein the first and second water-impermeable lithium selective conductive membranes are made of Lithium Lanthanum Titanium Oxide (LLTO).

15. The method of purifying and concentrating lithium (Li) according to claim 13, wherein the first and second water-impermeable lithium selective conductive membranes are made of one of Lithium Lanthanum Zirconium Tantalum Oxide LLZTO, Lithium Aluminum Titanium Phosphate LATP, Lithium Aluminum Germanium Phosphate LAGP, Lithium Aluminum Titanium Oxide LATO, or composite electrodes incorporating polymers, or composite electrodes incorporating lithium containing conducting salt.

* * * * *